Oct. 12, 1965
G. ULSH
3,210,883
FISH HOOK ANCHOR
Filed Feb. 12, 1963
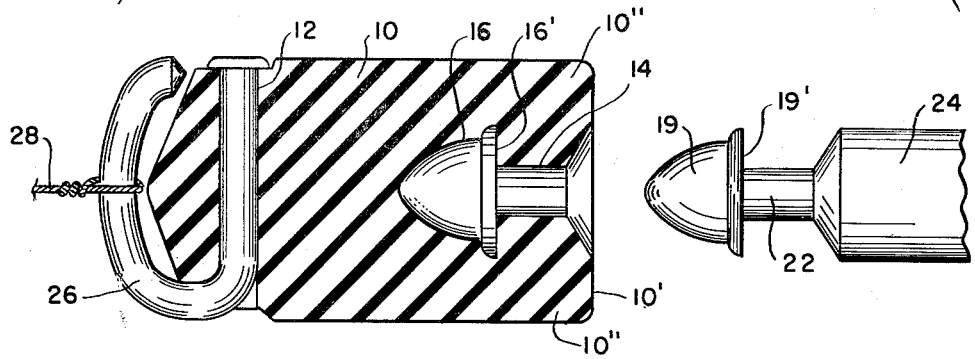
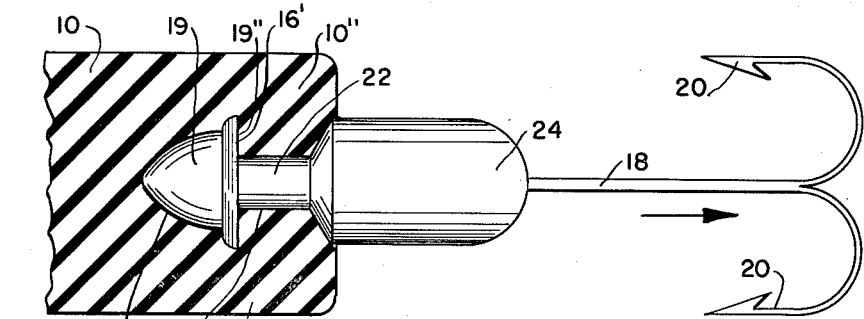
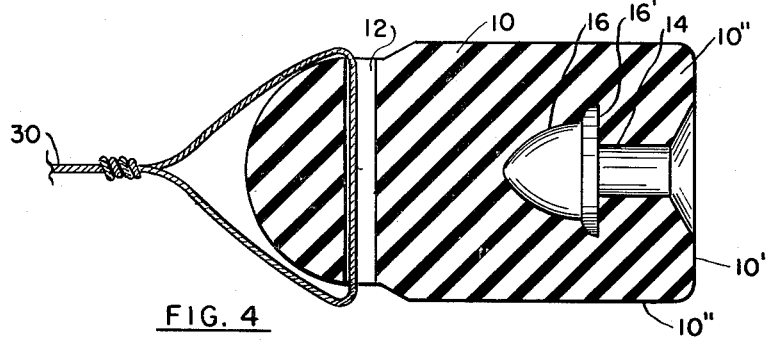
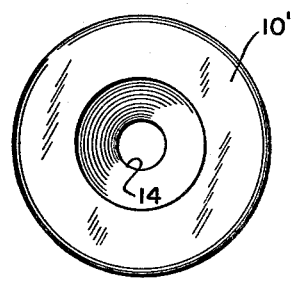
INVENTOR
GEORGE ULSH
BY *Wesley Everett*
ATTORNEY

United States Patent Office 3,210,883
Patented Oct. 12, 1965

3,210,883
FISH HOOK ANCHOR
George Ulsh, 7343 Windsor Mill Road, at Rolling Road,
Baltimore 7, Md.
Filed Feb. 12, 1963, Ser. No. 258,061
1 Claim. (Cl. 43—43.12)

The present invention relates to a device for releasing fish hooks from the fishing line or artificial bait such as, a plug or spoon as the case may be.

It is quite common when fishing in lakes or streams to have the hook engage some object in the water other than the fish and in many instances the hook cannot be disengaged and results in the loss of not only the hook, but the bait and part of the line and it is with this idea of saving the bait and line that this particular anchor has been developed whereby, if the hook is caught in some foreign object it may be released from the anchor by a pull slightly greater than necessary for catching the fish.

There is also the advantage that the hooks may be conveniently carried separately from the line, or bait when not used. If the hooks are not detached and not properly guarded they are a source from which many injuries stem. Also unguarded fish hooks at times get caught in clothing and equipment, causing annoyance and damage thereto. If the hook may be easily attached and conveniently removed and married in a magazine, as shown in my copending patent application, Serial No. 207,667, filed July 5, 1962, now U.S. Patent No. 3,142,931, granted August 4, 1964, there will be no inconvenience in attaching the hook and no annoyance by its presence on the line or lure.

The primary object of the invention is to provide an anchor that will release the hook when it gets caught in some foreign object while fishing for saving the line and bait after a predetermined pull on the line.

A further object of the invention is to provide such an anchor for a fish hook element that will require very little effort to either attach it to the anchor or to remove it therefrom.

While several objects of the invention have been set forth, other objects, uses and advantages will become more apparent as the nature of the invention is more fully disclosed, while resides in its novel feature herein set forth, the invention being illustrated in the accompanying drawings and specifically set forth in the description to follow:

FIGURE 1 is a horizontal sectional view of the anchor, and separated therefrom is a horizontal fragmentary view in elevation of the fish hook element showing means at one end of the shank for engaging the anchor.

FIGURE 2 is a horizontal fragmentary sectional view of the anchor and a horizontal view in elevation of the hook shank in engagement with the anchor.

FIGURE 3 is a horizontal sectional view of a modified form of anchor.

FIGURE 4 is a bottom plan view of the anchor as shown in FIGURES 1, 2 and 3.

In the drawings like reference numerals are used to point out like and similar parts throughout the several views.

The anchor comprises an elongated body 10 of elastic material such as rubber, or the like. At one end there is a hole 12 traversing the body for attaching the anchor to a fishing device, such as a line, plug, spoon etc.

At the opposite end of the body is a channel 14 extending inwardly from the end 10′ of the body to an enlarged cavity 16, which lies well within the body of the anchor and is adapted to receive an enlarged end 19 carried by the shank 18 of the hook 20. Immediately adjacent the head 19 is a reduced section 22 which is preferably substantially the same diameter and length as the channel 14. There is also shown a hollow portion 24 which is for receiving a material for holding the shank 18 in engagement with the head 19. While a particular form of head 19 is shown, the head may be of any desired construction, that is, being a part of the shank 18, such as, by swaging an enlarged head on the end of the shank similar to that of a screw or nail head.

The cavity is provided preferably with a shoulder 16′ extending about the inner end of the channel 14 and adapted to engage the shoulder 19′ of the enlarged head portion when the hook assembly 20 is moved in the direction of the channel relative to the anchor body 10.

In FIGURE 1 there is illustrated a ring or fixture 26 extending through the hole 12 for connecting the anchor to a fishing device. In the present drawing a fishing line 28 is shown attached to the ring 26.

In FIGURE 3 a fishing line is shown attached to the anchor by passing it through the hole 12. In fact, any suitable means may be used to attach the anchor to a fishing line or device, but the anchor should be attached so that the axis of the line of pull on the anchor will extend through its horizontal axis.

The surface 16′ of the cavity and the surface 19′ of the head are preferably perpendicular with the axis of the hook shank 18 and the channel 14 in order to have as small a head 19 as is necessary to create the required pull to initially start the disengagement of the anchor from the head 19 by expanding the area 10″ of the anchor adjacent the channel 14.

In FIGURE 1 the anchor 10 and the enlarged head 19 is shown as being disengaged.

To use the anchor, the hook element, including the enlarged head 19 is attached to the anchor by pushing the head 19 through the channel 14, by expanding the portion 10″ opposite the channel until the head reaches the cavity, which is adapted to receive the head. As the head is moved in place within the cavity, the channel will collapse about the portion 22, whereby the shoulder 19′ will then extend around the inner end of the channel 14 and in contact with the shoulder 16′ of the body member 10 and the enlarged portion 24 will engage the end of the anchor 10, as seen in FIG. 2.

In operation, when a pull is exerted in one direction by the line 28 or 30 and in the other direction by the hook element as indicated by the arrows in FIGURE 2, and when this pull has reached a predetermined amount the wall portion 10″ opposite the channel will expand and allow the head 19 to become detached from the anchor.

The amount of predetermined pull necessary to cause the anchor and hook element to part is normally regulated by the elasticity of the material from which the anchor is made. Of course, the size of the head may be changed and instead of the abrupt shoulders 16′ and 19′ they may be tapered, etc. (not shown). However, the best known form for the best operation at the present time, appears to keep the head 19 small and use the abrupt shoulders 16′ and 19′ as illustrated and previously described.

It will of course be understood that various changes may be made in the form, detail, arrangement and proportion of the parts without departing from the scope of the invention.

I claim:

A combination fish hook element and anchor member therefor in which the hook element includes an elongated shank having a hook on one end and a holding head affixed to the opposite end thereof adapted to be held by the said anchor member wherein:

(a) the holding head comprising an enlarged outer end portion including a substantially flat side, an extended cylindrical portion of less diameter than the said enlarged outer end portion and having one end extending from the flat side of the enlarged outer end portion including a substantially flat side, an exing outwardly from the opposite end of the cylindrical portion and having means for attaching the shank thereto;

(b) said anchor member comprising a tubular shaped one piece body of pliable rubber-like material of predetermined elasticity having an elongated aperture of a smaller diameter than the enlarged outer end portion of the holding head, the aperture extending inwardly through one end of the body portion and into the interior of the body portion, said anchor member having an inner cavity of larger diameter than the elongated aperture and connected with the inner end of the aperture;

(c) the reduced cylindrical portion of the holding portion of the holding head being substantially the same length and diameter as the said aperture in the anchor member, the adjacent end of the inner enlarged portion of the holding head being positioned to engage the anchor member about the outer end of the aperture;

(d) means carried on the opposite end of the anchor body member opposite the aperture for attaching the same to a fishing device;

whereby the area of the anchor body member adjacent the aperture is expanded under a predetermined pull between the fishing device and the said hook allowing the enlarged outer end portion of the anchor head to travel through the aperture from the cavity to the outer end of the aperture.

References Cited by the Examiner

UNITED STATES PATENTS

| | | | |
|---|---|---|---|
| 2,271,899 | 2/42 | Miller | 43—43.12 X |
| 2,563,533 | 8/51 | Knox | 24—123 X |
| 2,841,911 | 7/58 | Dahlgren | 43—43.12 |
| 3,091,885 | 6/63 | Ulsh | 43—43.12 X |

FOREIGN PATENTS

| | | |
|---|---|---|
| 587,043 | 11/59 | Canada. |
| 360,591 | 3/06 | France. |

SAMUEL KOREN, *Primary Examiner.*